United States Patent

[11] 3,626,105

[72] Inventors Jacques Henri De Jean Ris-Orangis, Essone; Marc Jean Pierre Leger, Issy-Les-Moulineaux, Hauts-de-Seine; Claude Paul Henri Lerouge, Maurepas, Yvelines, all of France

[21] Appl. No. 835,541
[22] Filed June 23, 1969
[45] Patented Dec. 7, 1971
[73] Assignee International Standard Electric Corporation New York, N.Y.
[32] Priority June 28, 1968
[33] France
[31] 157201

[54] INTERFACE UNIT FOR A TELEPHONE EXCHANGE
11 Claims, 9 Drawing Figs.

[52] U.S. Cl. .......... 179/18 ES
[51] Int. Cl. .......... H04q 3/54
[50] Field of Search .......... 179/18 ES

[56] References Cited
UNITED STATES PATENTS
3,532,827 10/1970 Ewin .......... 179/18 ES X

*Primary Examiner*—William C. Cooper
*Attorneys*—C. Cornell Remsen, Jr., Walter J. Baum, Percy P. Lantzy, Warren Whitesel, Delbert P. Warner and James B. Raden

ABSTRACT: An interface unit is provided for connection between each of a plurality of peripheral devices and a central processing unit. The peripheral devices include such things as subscribers lines, trunks and junctors. The interface unit includes a temporary memory for storing status information or instructions regarding the peripheral devices. A permanent memory delivers regulating signals for scanning current test inputs and comparing them with data stored in the temporary memory. When there is a discrepancy in the data in the memories, the unit calls the central processor and sends its information to the central processor, where it is processed and new data is sent back to the unit.

Inventors
J.H. DEJEAN
M.J.P. LEGER C.P.H. LEROUGE
By O. O. Warner
Attorney

INPUT-OUTPUT CIRCUIT

INTERFACE UNIT FOR A TELEPHONE EXCHANGE

The present invention concerns a circuit for controlling, in a data processing system, the connection between a plurality of peripheral equipments and a central processing unit which may be constituted either by a stored program computer, or by a wired program circuit.

In a particular case, taken by way of example, the system considered may be a telephone exchange wherein the peripheral equipments or peripheral units are the subscribers lines, the cross-points of the switching network, the junctors, the multiselector bars, etc.

A connection between a peripheral unit and the central processor is set up each time data must be transmitted, in either direction between these elements. This data is such that it is useful in the performance of various telephonic functions such as, on the one hand, the line trunk, junctor or network supervision and; on the other hand, the control of the bars in a multiselector, digit reception, fault detection, etc.

The universal connection circuit according to the invention or connection unit which is designed for assuring the connection between a group of peripheral units and the central processor has been designed in order to enable its achievement into one single monolithic integrated circuit and it may assure any one of these functions without any modification of its internal wiring.

A connection unit provided for cooperating with $x$ peripheral units comprises $m$ input terminals ($x \leq m$) connected partly or totally to said peripheral units in order to test their state, a memory with $m$ flip-flops in which will be stored, for instance, the previous state of the tested units and $m$ output terminals connected partly or totally to the peripheral units in order to transmit therethrough the orders received from the control unit.

The supervision of the states of the peripheral units connected to the inputs and the transmission of this data to the processor unit are carried out cyclically under the control of $m$ scanning signals delivered by a main clock.

In a mode of achievement of a telephone exchange, designed preferably for a small capacity exchange such as a private exchange (PABX), these connection units have access to the processor through random selection circuits connected in chain and which are able to select at random one unit among those which are calling for connecting it to the input-output circuit of the processor.

A connection unit appears to be calling when one has detected, by the cyclic scanning of the inputs, a change of state in one of the peripheral units. Besides, when the control unit wants to know the state of one peripheral unit or to transfer an order to it, the selection of the corresponding connection unit is carried by sending to the unit an order which sets it in the calling state in such a way as this call has automatically a high priority level.

It is thus seen that, in this organization, the data transfers between connection units and the processor do not require any priority circuit and are carried out without the intervention of an interrupt routine or of interrupt instructions.

The data processing in the central processor is carried out in a well-known way by means, either of a wired program or a number of stored secondary routines. Thus, when the connection is established between a connection unit and the processor, this latter receives the identification codes of the connection unit and the content of its memory. This information, which defines the type of function carried out by the unit (line supervision, digit reception etc.), its identity and—eventually—the state of advancement of the operation, enable to select—in the case of a stored program, the required routine. At the end of the processing, the results are transmitted to the connection unit so that the capacity of the fast memory associated to the processor is significantly reduced since said memory stores only the data related to the elementary operation which is being made.

Nevertheless, when the connection unit is associated to a digit receiver, the information related to the advancement of the digit reception is well stored in the memory of said unit but it is realized that the register itself, which is the unit in which the digits are assembled, must occupy an address in a call memory associated to the processor.

On the other hand, the programming is very simplified since the supervision operations are programmed cyclically.

The object of the invention is thus to achieve, for a data processing system, a universal connection unit linking a number of peripheral units to a central processor which enables to carry out, in said peripheral units, state tests, commands the control of the state of advancement of operations, data storage etc.

Another object of the invention lies upon the face that all the connection units are identical whatever may be the executed function.

A feature of the invention is that a main clock delivers in a cyclic way, signals to, $t1$, $t2$.... $tm$, of equal duration; that each universal connection unit comprises first $m$ inputs E1, E2...E$m$ selected cyclically by the signals $t1$, $t2$... $tm$, second a temporary memory comprising m flip-flops G1, G2... G$m$ the outputs of which are selected by the signals $t1$, $t2$... $tm$, third a permanent memory delivering a signal C$c$ at each of the $p1$ scanning times ($p1 \leq m$) which correspond to $p1$ test inputs—such as the input E$j$ —which are connected to peripheral units in order to test their state, fourth a comparator which delivers, at time $tj$, a disparity signal M when the state of the test input E$j$ is different from that of the flip-flop G$j$ and fifth an input-output circuit comprising a call flip-flop B which is put to the 1 state either by a signal M or by the control processor of the telephone exchange when this latter wants to select the considered connection unit.

Another feature of the invention is that the connection between one calling connection unit (N1, N2...N$k$ ...Ny) and the input-output circuit I0 of the processor is carried out through selection circuits grouping $n$ connection units, and said selection circuits being connected so that there is a multilevel selection, that each of said selection circuits comprises a multistable circuit with $n$+1 stable states and a transfer circuit assuring a bidirectional transfer of data between the selected connection unit N$k$ and the circuit I0, that the first selection level comprises $z$ selection circuits, that the multistable circuit of each selection circuit is connected to the 1 outputs of the call flip-flops of $n$ connection units, that said circuit delivers, when the call flip-flop B$k$ of the unit N$k$ is in the 1 state, an activation signal of the transfer gates associated with said unit and a call signal of the next selection level etc... and that, if several connection units are simultaneously calling, said multistable circuit chooses one of them without any ambiguity and at random.

Another feature of the present invention is that, when the processor wants to select directly the unit N$k$, it transmits simultaneously, at the initial time, a signal Z to all the connection units of the central exchange which resets all the call flip-flops and a signal D$k$ which sets to the 1 state the flip-flop B$k$ so that only the unit N$k$ is calling and that it is immediately connected to the circuit I0, the signal D$k$ being delivered by the decoding of the identification code of the unit N$k$.

Another feature of the present invention is that, when the unit N$k$ is selected by the call either of a peripheral unit or by the control unit, the states of the inputs E1, E2... E$m$ and of the flip-flops G1, G2... G$m$ are transferred, through the various selection stages, to the circuit I0 as well as the identification codes of the connection units and of the used selection circuits that, when the call originates from a peripheral unit, the comparison of these signals in the said circuit I0 gives the identification code of the first input whose state has changed and that this information is processed under the control of the processor program.

Another feature of the present invention is that, when the data processing is completed in the processor, a signal D$k$ is transmitted to the unit N$k$ so as to block the operation of said unit and that the information supplied by the processor is transferred to said connection unit under the control of the signals $t1$, $t2$... $tm$.

Another feature of the invention is that the universal connection unit may perform without any modification of its internal wiring, any test, data collection, operation command and operation control of functions, that the state test function of peripheral units is carried out through the $a.x=p1$ inputs connected to suitable points of $x$ peripheral units ($a$ being an integer number such as $2^a$ represents the number of possible different states), the $a.x$ homologous flip-flops of the temporary memory being associated respectively to these peripheral units in order to store therein, under the control of the processor, the previous state informations, that the function of collecting the data elaborated in the peripheral units is carried out through $b.x.=p3$ inputs ($b$ being the number of digits to be collected), that one has $p1+p3 \leq m$, that the operation command function, in the peripheral unit H$j$, is obtained by transmitting an order to the $jth$ group of $c$ order flip-flops reserved to this function with $c.x=p$ 4, that the operation control function, in the peripheral unit H$j$, is obtained by transmitting an operation code to the $jth$ group of $d$ operation flip-flops reserved to this function with $d.x=p2$, that the order and operation flip-flops may be homologous to the data collection inputs and that one has $p1+p2+p4 \leq m$.

Another feature of the invention is that the series of signals C$d$, supplied by the permanent memory during one cycle of the scanning signals $t1$, $t2$... $tm$, may be used as a function code characterizing the type of function fulfilled by the connection unit, and that the functions for which $p1=m$ may be differentiated the ones from the others in leaving free one input of different index according to the function.

The above-mentioned and other features and objects of this invention will become apparent by reference to the following description taken in conjunction with the accompanying drawings in which.

Figures 5, 6:
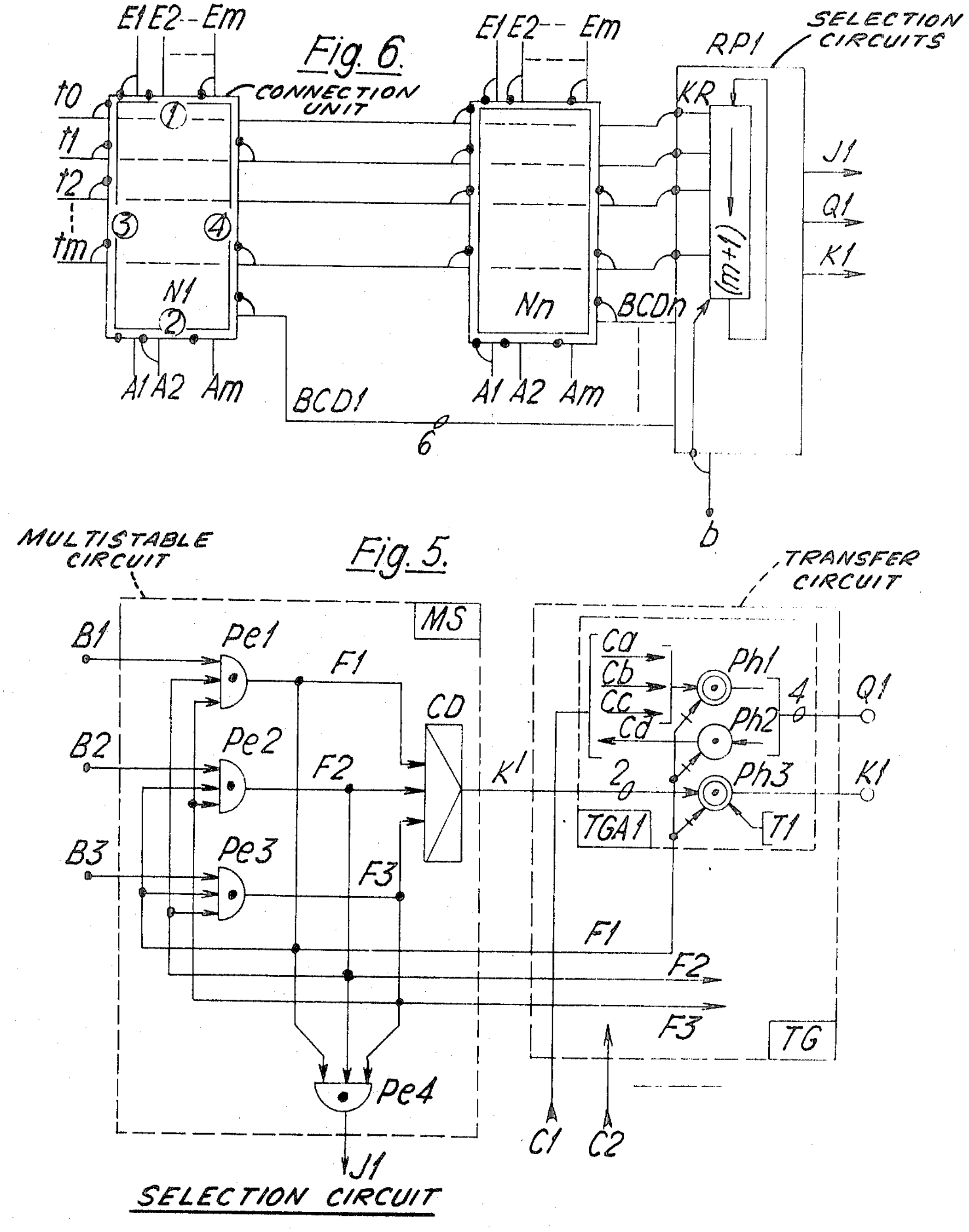
Figure 7:
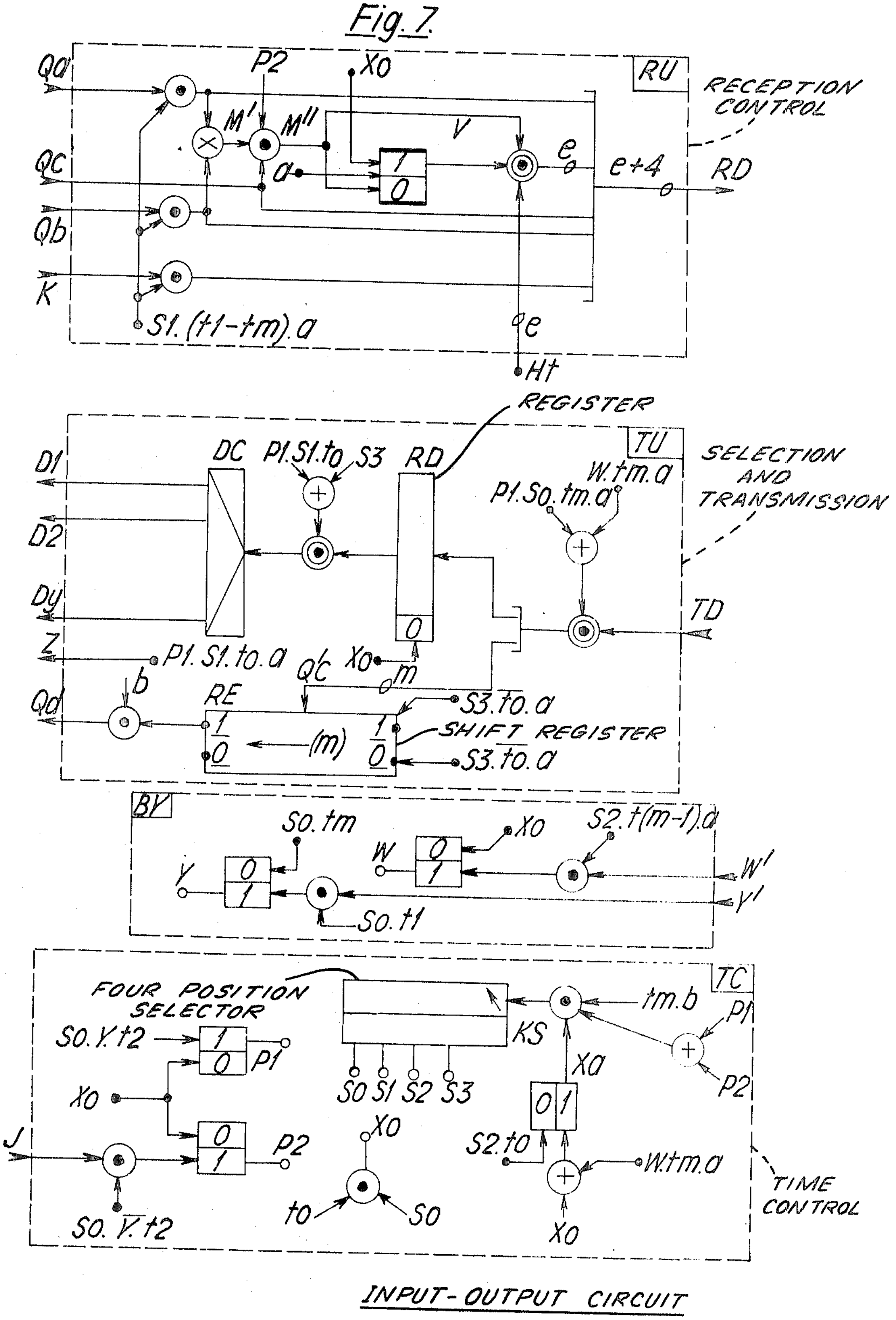

FIG. 4$a$ to 4$c$ represent diagrams of signals supplied by the clock;

FIG. 5 represents the general diagram of a selection circuit;

FIG. 6 represents the topology of an assembly of connection units and of an associated selection unit designed in large-scale integrated circuits;

FIG. 7 represents the detailed diagram of an input-output circuit associated to the central processor.

In order to facilitate its reading, the description will be divided as follows:

1. General diagram
  1.1—Description (FIG. 1)
  1.2—Clock (FIGS. 2 and 4)
2. Linking unit
  2.1—Description (FIG. 3)
  2.2—Operation
    2.21—Call
    2.22—Transfers of information to the selected connection unit
    2.23—Disconnection
3. Utilization of the connection units
  3.1—Assignment of the inputs and the flip-flops
  3.2—Specialization of the connection units
  3.3—Digit supervision
4. Selection circuit (FIG. 5)
5. Topology (FIG. 6)
6. Input-output circuit I0 (FIG. 7)
  6.1—Introduction
  6.2—Description and operation
7. Identification

1. GENERAL DIAGRAM 1.1—Description

Figure 1:
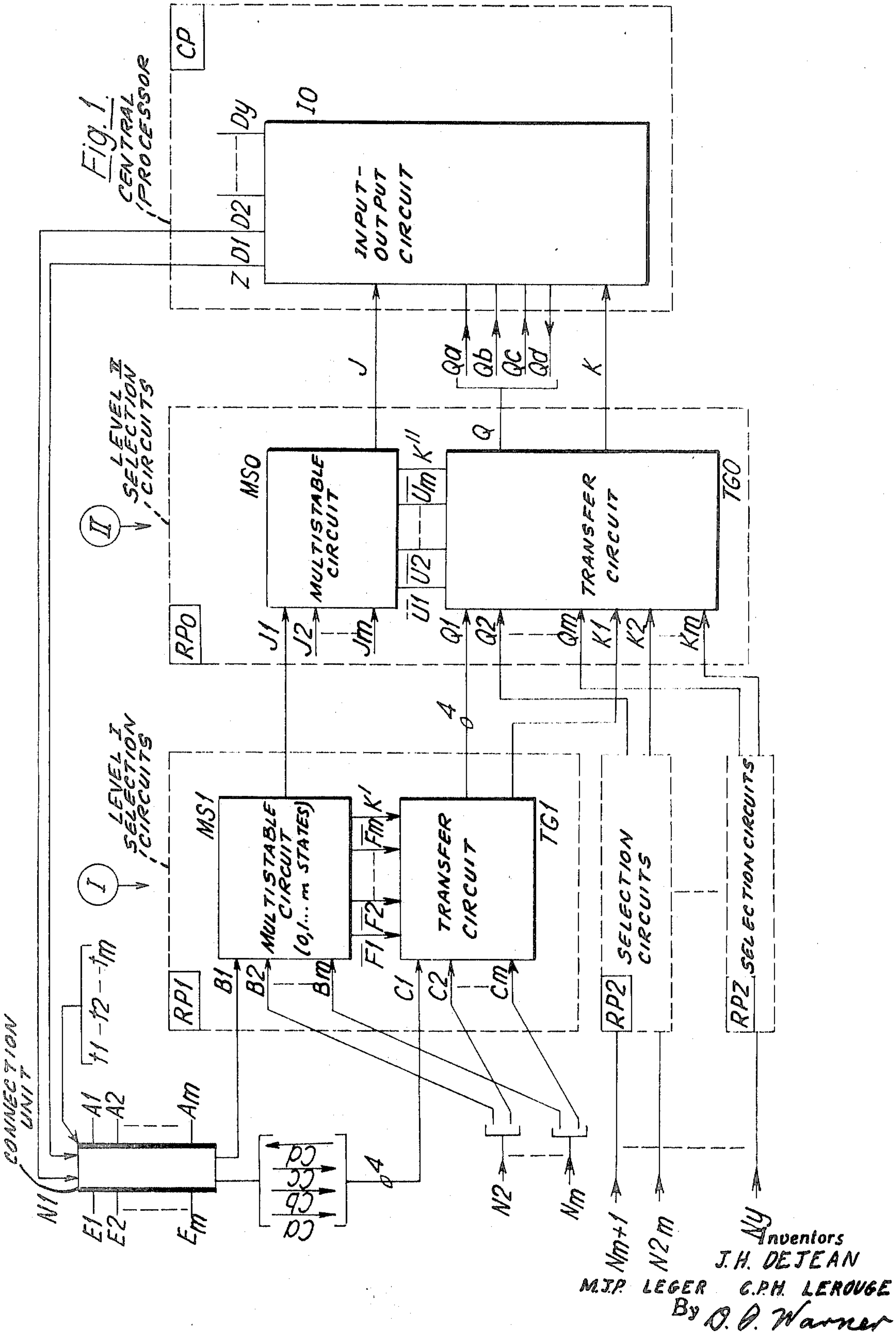
FIG. 1 represents the general diagram of the organization of a telephone exchange equipped with connection units.

FIG. 1 represents the general diagram of the organization of a central exchange comprising the universal connection units N1, N2.... Ny.

Each connection unit, such as the unit N1, comprises $m$ inputs E1, E2... E$m$ and $m$ outputs A1, A2... A$m$, these $2m$ terminals being intended for being connected to suitable points of at most $m$ peripheral units. The inputs of one connection unit are used, for instance, to test the state of the peripheral units to which it is associated (line, junctor, state test, etc.) this test being carried out cyclically under the control of clock signals $t1$, $t2$... $tm$ assigned respectively to the test of the inputs E1, E2... E$m$.

One has shown also on FIG. 1:

The input-output circuit I0 of the central processor CP,

The random selection circuits which control the connection between the connection units and the circuit I0. These circuits are cascaded in such a way as to constitute several selection levels. Thus the first level or level I comprises $z$ circuits RP1, RP2... RP$z$, each of these circuits being connected by means of $n$ conductors to $n$ connection units and having, moreover, three conductors or groups of output conductors connected to the circuits of the level II. This level II comprises the group of circuits RP$o$ and has $z$ inputs and three conductors or output groups of conductors.

By way of example, one will choose $z=n$ and $y=m^2$ so that the selection comprises two levels and the selection units are identical.

Besides the inputs and outputs E1 to E$m$, A1 to A$m$, the connection unit N1 has first an output B1 on which a signal appears when the unit is calling (for instance when the state of one of the peripheral units to which it is connected has just changed) and second an output C1 grouping four conductors C$a$, C$b$, C$c$, C$d$ on which are carried out the transfers of information between the unit and the circuit I0.

A selection circuit such as the circuit RP1 of the level I comprises:

1. The multistable circuit MS1 which has $m+1$ stable states referenced 0 state, 1 state... $m$ state. The states 1, 2... $m$ are characterized by the occurrence of a state signal, respectively, on the outputs $\overline{F1}$, $\overline{F2}$... $\overline{Fm}$ and the 0 state by the logic condition FO=F1.F2... F$m$, the sign "." showing symbolically the logical AND function. The switching of the circuit MS1 to a state other than the 0 state, the state $k$ for instance, is carried out when the connection unit N$k$ is calling. It will be seen further on (paragraph 4) that the circuit MS1 is so designed that, if for instance it receives simultaneously signals B1 and B2, it sets itself without any ambiguity in either of the 1 or 2 states this constituting random selection. Besides, the circuit MS1 supplies, for the condition $\overline{Fo}$, on the one hand a code identifying the calling connection unit which appears on the output K', and on the other hand, a call signal J1 for the level selection circuit II.

The multistable circuits of the circuits RP2, RP3... RP$z$ and RP$o$ are identical; the state outputs of the circuit RP$O$ being designated by $\overline{U1}$, $\overline{U2}$... $\overline{Um}$ and its code output by K''.

2. The transfer circuit TG1 which connects, under the control of the state signal F$k$, the groups of conductors C$k$ and K' to the outputs referenced respectively Q1 and K1 which are themselves connected to the corresponding inputs of the circuit RP$o$, level II.

This circuit RP$o$ comprises the output J on which appears a call signal of the circuit IO and the output K constituted by the transfer conductors of the codes which identify the calling inputs in the selection circuits used in levels I and II. The distinction is thus made between:

The code H$k$1 of the calling input in the level I,

The code H$k$2 of the calling input in the level II.

The code H*k* constituted by grouping these two codes identifies therefore, without any ambiguity, the calling unit N*k*.

Last, each connection unit N1, N2... N*y* may be selected directly by the circuit IO, for instance in the search for a free junctor in a group of *m* junctors. For this purpose, the circuit IO selects individually a connection unit by means of one of the *y* selection conductors D1, D2... D*k*..D*y*. The signal D*k* controls the setting, in the unit N*k*, of the call signal B*k* and, at the same time, all of the other units are reset to 0 so that the selection circuits may immediately achieve the connection between the unit N*k* to the circuit IO.

1.2—Clock

Figure 2:
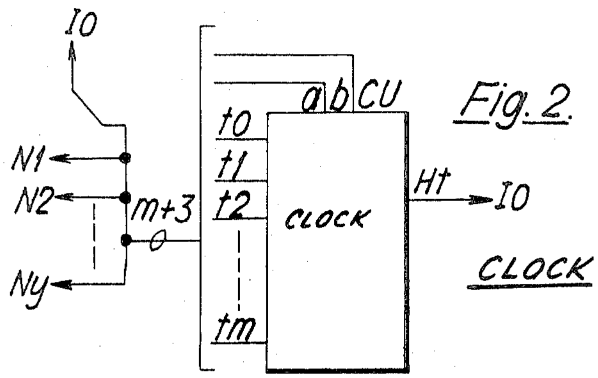
FIG. 2 represents the general diagram of the clock.
Figures 4A, 4B, 4C:
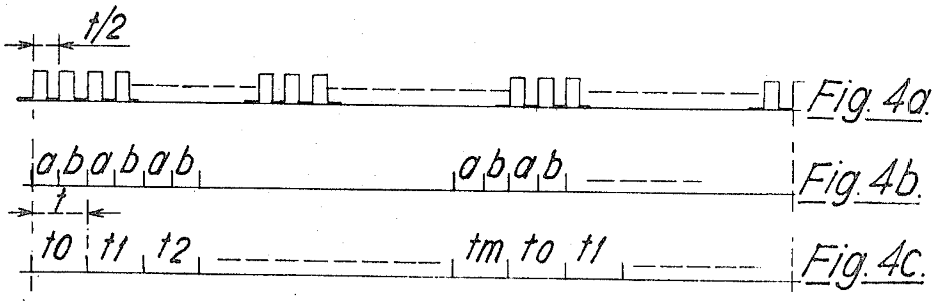

FIG. 2 represents the general diagram of the clock CU utilized for the control of the operations in the connection units and in the input-output circuit IO of the central processor CP. The design of such a clock is well known and the detailed description will not be given. It comprises:

- A pulse generator supplying base signals of period *t*/2 and of duty factor 0.5 represented on FIG. 4*a*;
- A scale-of-two supplying alternatively timing signals *a* and *b* each one having a period of *t*/2 (FIG. 4*b*);
- A divider by *m*+1 constituted by a counter of capacity *m*+1 numbers receiving, as advance signals, the timing signals *b*. An associated decoder supplies in a recurrent way signals to, *t*1, *t*2... *tm* of period *t* (FIG. 4*c*), the signal to defining the beginning of each scanning cycle. The signals *t*1, *t*2... *tm* are the signals which control the cyclic scanning of the inputs of the units N1, N2... N*y*. The codes shown by this counter are transmitted to the circuit IO over the group of conductors H*t*. The signals *t*O to *tm* and the signals *a*, *b* are transmitted to the connection units and to the circuit IO.

2. CONNECTION UNIT 2.1—Description

Figure 3:
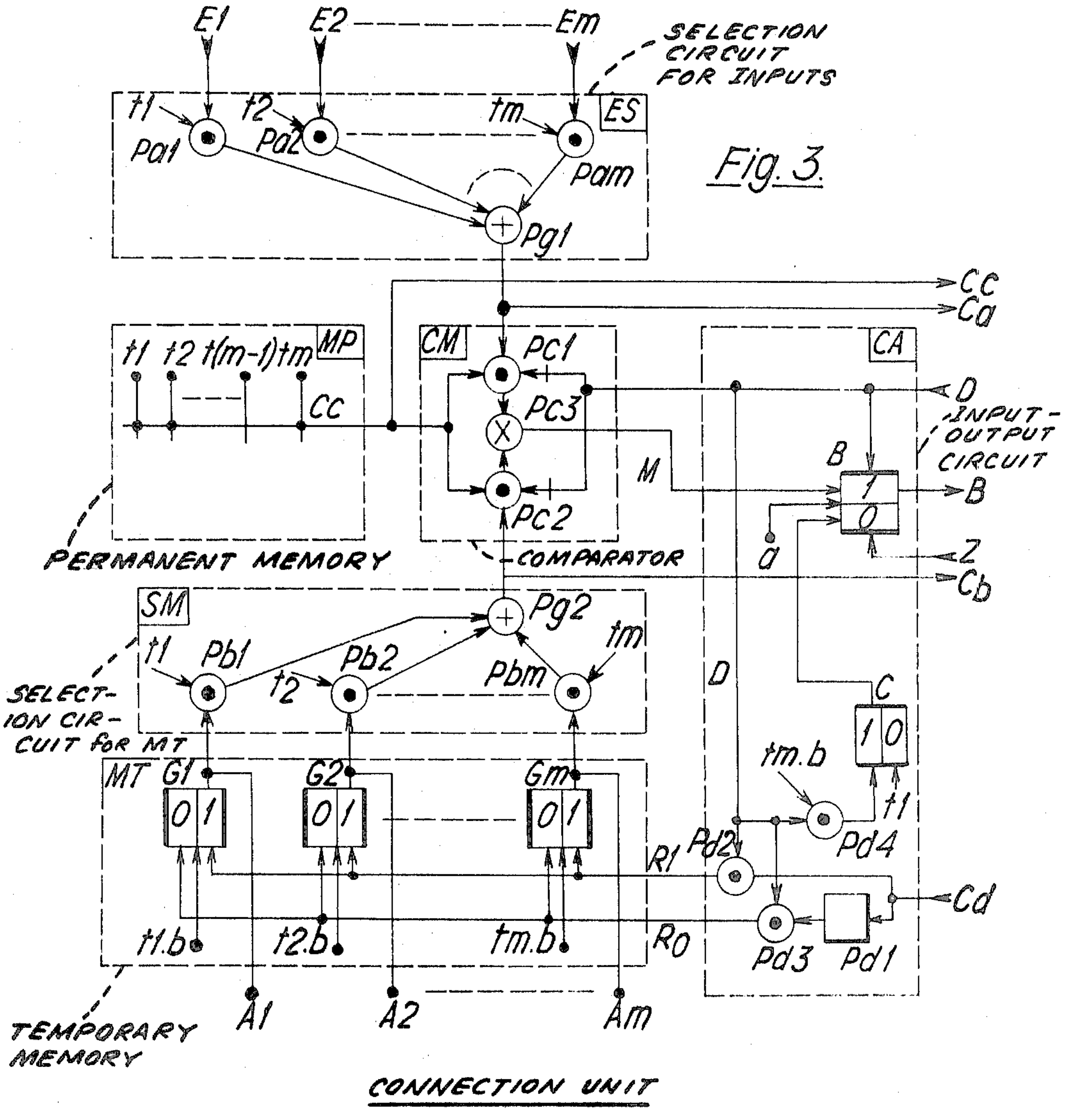
FIG. 3 represents the detailed diagram of one universal linking unit.

FIG. 3 represents the detailed diagram of the unit N1 wherein *p*1 inputs (*p*1 ≤ *m*) or test inputs are connected to the peripheral units in order to supervise their state.

The unit N1 comprises:

- The selection circuit ES of the inputs which assures, under the control of the signals *t*1, *t*2... *tm* applied to the AND-circuits P*a*1–P*am*, the cyclic scanning of the inputs E1, E2... E*m*,
- The temporary memory MT which comprises *m* flip-flops referenced G1 to G*m*, among which the *p*1 flip-flops of same rank as the test inputs may be used for storing the information of previous state of the corresponding peripheral units. The information which must be written in these flip-flops are received in a series form on the conductor C*d*.

By way of nonlimitative example, one has shown on the figure, a memory MT equipped with JK flip-flops which receives, as clock signals, the signals *t*1, *t*2... *tm* at the times *b*. These signals control the series-parallel conversion of the data received over the conductor C*d* when writing them in the flip-flops.

It is realized that one may use as well, for designing this memory, RS flip-flops, the series-parallel conversion being then carried out through AND circuits controlled at the times shown on the figure.

The selection circuit SM of the flip-flops of the memory MT comprising the AND-circuits P*b*1 to P*bm* which are successively activated by the signals *t*1, *t*2... *tm* assuring therefore the cyclic scanning of the states of these flip-flops and the OR-circuit P*g*2.

The permanent memory MP which supplies, on its output C*c*, signals at the *p*1 times corresponding to the test inputs scanning times. It is constituted by *m* cross-points which may or may not assure the transmission of the signals *t*1, *t*2... *tm* to the output C*c* in order to control the selection of those of the inputs E1 to E*m* which are used as test inputs. Thus, on the figure, one has chosen as test inputs the inputs E1, E2 and E*m* by making an electrical connection between the wires on which the signals *t*1, *t*2 and *tm* appear and the conductor C*c*.

The comparator OM comprising the AND-circuits P*c*1, P*c*2 and the exclusive OR-circuit P*c*3. Each AND circuit comprises an activation input connected to the conductor C*c* and a blocking input connected to the conductor D so that the signals supplied by the gates P*g*1 and P*g*2 are applied to the circuit P*c*3 for the logical condition $Cc.\overline{D}$. This circuit delivers then a disparity signal M if the information applied on its inputs is different.

Thus, for instance, if the state of the peripheral unit *j* tested at time *tj* is different from the previous state stored in the flip-flop G*j*, the comparator supplies a signal M at this time *tj*.

The input-output circuit CA of the connection unit which comprises in particular, the JK flip-flop B and the RS flip-flop C.

When the call flip-flop B, which is initially in the 0 state, is set to the 1 state (for instance by a signal M), this condition means that the connection unit appears to be calling and requests to be connected to the circuit IO of the processor.

In the same way as for the memory MT, the flip-flop B may be chosen of the types RS by adjoining to it the required control logical circuits.

Before describing the operation of the linking unit, the operation of RS and JK flip-flops will be reviewed.

In a RS flip-flop, the passage to the 1 state or to the 0 state is controlled by the application of a signal on the 1 or 0 input. A voltage of same polarity as that of the controlled signals appears either on the 1 output when the flip-flop is in the 1 state or on the 0 output when it is in the 0 state with a time delay which is a function of the elements of the circuit. If the flip-flop is referenced C, the logical condition characterizing the fact that it is in the 1 or 0 state will be written C or $\overline{C}$. It will be noted that, if one applies simultaneously control signals on the 0 and 1 inputs, the final state of the flip-flop is undetermined.

In a JK flip-flop, such as the flip-flop B, the change of state consecutive to the application of a control signal on one of the 1 or 0 inputs is controlled by a clock signal. The switching occurs for instance on the trailing edge of the clock pulse a so that the time delay between the triggering and the appearance of the corresponding signal on the 0 or 1 output is fixed by the duration of the clock signal. Besides, this flip-flop may be forced to the 1 state or to the 0 state, whatever may be the amplitude of the clock signal, by applying a control signal on the input D or Z.

2.2—Operation

The operation of the connection unit N1 (FIG. 1) will be described now by recalling that this latter is calling when its flip-flop B (FIG. 3) is in the 1 state, which occurs either when the state of one of the peripheral units to which it is connected has changed, or when the processor CP wants to communicate with this unit.

When the peripheral unit is connected to the circuit IO (FIG. 1), there are data transfers between these two elements and, at the end, the flip-flop B is reset to the 0 state thus disconnecting the connection unit.

These various operations are grouped as follows:

2.21—Call 2.211 Call originating from a peripheral unit. As it has been seen hereabove, the comparator CM supplies a signal M at the time *tj* when the states of the input E*j* and of the flip-flop G*j* are different and the flip-flop B is set to the 1 state. If the circuits RP1 and RPo (FIG. 1) select the unit N1 by supplying the signals $\overline{F1}$ and $\overline{U1}$, this latter is connected to the circuit IO. The states of the inputs, those of the flip-flops of the memory MT and the output signals of the permanent memory MP are then transmitted in series form over the conductors C*a*, C*b*, C*c* to the circuit IO, this transmission being controlled by the signals *t*1, *t*2... *tm*. In the circuit IO, which will be described in detail under paragraph 6, one compares the received informations for identifying the input E*j* so that one has thus, together with the code H$k$ received over the conductor K, the complete identification code of this input. All this information is transmitted to the unit CP and is processed by a subprogram chosen according to the function of the connection unit and, as the case may be, according to the state of advancement of the operation.

At the end of the data processing in the unit CP, the codes and the results are sent to the circuit IO.

2.212—Call originating from the processor. When the processor wants to obtain data from a peripheral unit or to send an order to said unit the circuit IO sends, at time $to.a$, a signal Z to all the connection units of the central exchange and, during all the time $to$, a signal D$k$ to the connection unit N$k$ assigned to this peripheral unit. In the nonselected units, the JK flip-flop B receives only the resetting signal Z. In the unit N1 the flip-flop receives moreover in $t0.b$, a control signal D$k$ and sets thus into the 1 state. The unit N1 is then the only calling unit and is immediately connected to the circuit IO by means of the circuits RP1 and RPO.

During times $t1$, $t2$... $tm$, the information, such as the code of peripheral unit, is transmitted to the circuit IO and the continuation of the operations is also the same.

2.22—Transfer of information to the selected unit.

In the two types of call, the information for the connection unit N$k$ is transmitted in series form over the conductor C$d$ during the times $t1$ to $tm$ of the cycle defined by the signal D$k$. In the unit N$k$, this signal controls the blocking of the comparator CM and the activation of the gates P$d$2, P$d$3 and the information is applied to the flip-flops G1–G$m$ over the complementary conductors R1 and RO (inverter P$d$1).

2.23—Disconnection.

At the end of the transmission, at the time $tm.b$, the circuit-AND P$d$4 is activated and controls the setting to the 1 state of the flip-flop C. At the next fine time, i.e. in $to.a$ of the following cycle, the flip-flop B receives a resetting signal.

3. UTILIZATION OF THE CONNECTION UNITS 3.1—Assignment of the inputs and of the flip-flops In the description of FIG. 3, we have assumed that $p1$ inputs ($p1 \leq m$) of the connection unit were used as test inputs with the $p1$ homologous flip-flops of the memory MT. It results therefrom that, if $p1 < m$, ($m-p1$) flip-flops remain available for storing therein other data such as, for instance, the codes characterizing the state of advancement of an operation comprising several steps or orders of operations to be performed in the peripheral unit by means of the corresponding output terminals of the memory MT. Some of these ($m-p1$) available inputs may also be used for transferring, to the circuit CP, data collected in the peripheral units.

In a general way each flip-flop, or each group of flip-flops of the memory MT, may receive one of the following assignments:

Supervisory memory SUP which contains the previous state information of one of the $p1$ peripheral units associated to the connection unit. This information is compared to that collected on the homologous input.

Order memory ORD which receives, from the processor, an information enabling to control certain operations in the peripheral unit to which it is associated.

Operation memory OPR which contains the code characterizing the state of advancement of an operation which is being performed in the peripheral unit to which it is associated.

It will be noted that this memory may also be used as a buffer memory in which the informations sent by the circuit CP are temporarily stored.

According to the function filled by each connection unit, the flip-flops of its memory MT may receive one or several of these assignments and some of the ($m-p1$) free inputs may be used as it has been seen hereabove, for transferring to the circuit CP informations coming from the peripheral units.

3.2—Specialization of the connection units

Table 1 hereafter gives, by way of a nonlimitative example, different types of operations which may be executed, without any modification of its internal wiring, by a universal connection unit according to the invention, the columns giving the assignment of the inputs, of the outputs and of the flip-flops of the memory MT. It will be seen nevertheless, later on, that the connection units are "specialized"as soon as they are wired.

TABLE 1

| Function | | Inputs: Test | Inputs: Data gathering | Memory MT: SUP | Memory MT: ORD | Memory MT: OPR | Outputs |
|---|---|---|---|---|---|---|---|
| Na | Line and trunk supervision | X | | X | | | |
| Nb | Junctor supervision | X | | X | X | | X |
| Nc | Network supervision | X | | X | | | |
| Nd | Network control and verification | X | | | X | | X |
| Ne | Digit supervision | X | X | X | | X | X |
| Nf | Fault detection | X | | X | X | | X |

Thus for the function N$a$ of line or trunk supervision, the inputs are connected to $m$ subscribers' lines or trunks and the homologous flip-flops of the memory MT are used as supervision memories.

For the function N$b$ of junctor supervision, it will be assumed that it comprises, not only the supervision of the state of the junctors but also the supervision of two half-connections set up from each busy junctor.

Under these conditions, a number of inputs and the corresponding supervision flip-flops are assigned to these functions. Besides, for each junctor, one takes two flip-flops as order memories and two outputs for the control of the setting-up and of the breaking of each half-connection.

The function N$c$ of network test in a multiselector is of the same type as the function N$a$.

For the network control and verification function N$d$ concerning the bars of multiselectors, the order memory receives the information related to the bars to be controlled and the inputs are used for receiving the signals characterizing the fact that the operation has been carried out. One compares these signals to those written in the memory of orders in order to detect the errors.

The fault detection function N$f$ consists in questioning certain circuits of the central exchange under the control of a check program.

It thus requires:

Orders flip-flops receiving the codes of the operations to be carried out in the circuits;

Test inputs and the homologous supervision flip-flops which store the result which has to be obtained and which must be compared to the result appearing on the test inputs.

Last, for the digit supervision function N$e$, the connection unit operates in association with several digit receivers provided for transforming the signals received under the form of dial pulses or of voice frequencies into binary digits. Each receiver uses then:

$a$ inlets and a supervision flip-flop which enable to carry out its test of state (free, busy) and the supervision of the numbering in course ($p1=a.x$), $d$ operation flip-flops which contain the code characterizing the state of advancement of the numbering (number of the digit being reconstituted), $b$ data collection inputs which enable the transfer to the processor of the digit reconstituted by the numbering receiver.

It is well understood that the rank of the operation flip-flops and of these $b$ data collection inlets may coincide since only the information of the $a$ inputs and supervision flip-flops are compared under the control of the signals supplied by the permanent memory MP.

TABLE II

| State of the inputs E1–E2 and corresponding conditions | State of the flipflops G1–G2 and corresponding conditions |
|---|---|
| 00—Receiver free | 00—Receiver free. |
| 11—Digit reception | 11—Receiver on-line. |
| 10—Digit complete. | |
| 01—End of numbering. | |

3.3—Digit supervision

By way of nonlimitative examples we shall describe, in relation with the table II, the organization and the mode of operation of a connection unit specialized for performing the function N$e$.

One uses, for the digit receiver R1 associated to the connection unit N$k$:

The test inputs E1, E2 and the supervision flip-flops G1, G2 (see FIG. 3), vizus $a$=2;

The operation flip-flops G3, G4, G5 ($d$=3) which gives eight different operations codes O$p$1, O$p$2 . . . O$p$8;

The data collection inputs E3, E4, E5, E6 ($b$=4) enabling the transfer, to the circuit IO, of a digit in decimal binary code.

The operations which are carried out in a digit receiver are well known and it will be merely reminded that they comprise a succession of phases the first one of which is started by the connection of the receiver to the calling line and the following ones along as the reconstitution of the digits takes place. At the beginning of each phase, a counter is initiated defining the maximum time which may elapse up to the reception of one digit. If this time is exceded without a digit being reconstituted, the receiver is disconnected and a particular signal is sent on the calling line.

As it may be seen on table II, the fact that the inputs E1, E2 and the flip-flops G1, G2 are in the 0 state means that the receiver R1 is free. In the homologous flip-flop being in the same state, one has always the condition $\overline{M}$.

When the circuit CP searches for a free receiver in order to connect it to a calling line, it calls successively the various connection units of the central exchange assigned to the function N$e$ by a process which will be described in paragraph 7. When both supervision flip-flops assigned to a receiver, R1 for instance, are in the 0 state, said circuit CP controls the connection of the calling line to this receiver (by performing for instance, the functions N$c$ and N$d$).. When the connection is set up, the circuit CP calls once again the unit N$k$ and controls, during one cycle of signals $t1$–$tm$, the setting to the 1 state of the flip-flops G1, G2 and the sending of the first operation code O$p$1. At time to of the following cycle, the inputs E1 and E2 are in the 1 state so that one has the condition $\overline{M}$ and the code O$p$1 controls the sending of the dial tone and the starting of the first time delay.

When one digit is reconstituted and stored in its totality in the output register of the receiver R1, the input E2 resets to the 0 state whereas the homologous flip-flop G2 is still in the 1 state so that a signal M appears and that the flip-flop B$k$ is set to the 1 state. When all the informations are transferred to the circuit CP, this latter processes them and sends to the connection unit N$k$ a signal for setting to the flip-flop G2 in the 1 state and the operation code O$p$2 etc.

When a digit is not reconstituted at the end of the time delay, the input E1 shifts to the 0 state, there is a discordance with the flip-flop G1 and the unit N$k$ calls the circuit CP. When this latter receives the information, it processes it, controls the disconnection of the receiver R1, the sending of the busy tone on the line and the setting to the 0 state of the flip-flops G1 and G2 in the unit N$k$.

4. SELECTION CIRCUIT

FIG. 5 represents a random selection circuit such as RP1 . . . RP$z$, RP$o$, FIG. 1.

Each selection circuit comprises a $n$ input multistable circuit MS and a transfer circuit TG. In order to simplify the figure and the description, on has shown a circuit MS comprising $n$=3 inputs to which are applied the call signals B1, B2, B3. This circuit comprises $n$+1=4 NAND-gates referenced P$e$1, P$e$2, P$e$3, P$e$4 and a coder CD. It will be recalled that a NAND-gate is equivalent to an AND-circuit followed by an inverter so that, if one designates by Y$a$, Y$b$, Y$c$ the control signals applied to the inputs of a 3-input gate and by Y$o$ its output signal, one may write, in logical algebra: $Yo=\overline{Ya.Yb.Yc}$ or $\overline{Yo}=Ya.Yb.Yc$ It is thus seen that such a circuit delivers a signal $\overline{Yo}$ only if all the inputs receive a control signal.

Each gate P$ek$ (in the case of the figure $k$=1, 2 or 3) comprises an output on which appears a signal F$k$ and $n$ inputs, one of which receiving the signal B$k$. The $n$–1 remaining inputs of each gate are connected respectively to the outputs of the $n$–1 other gates (all the output signals except F$k$), this feedback assuring the stability of the multistable circuit.

In order to describe the operation of this circuit, we shall first assume that it receives signals $\overline{B1}$, $\overline{B2}$, $\overline{B3}$ (none of the connection units to which it is connected is calling). In this case, each of the gates P$e$1, P$e$2, P$e$3 which receives at least one complementary signal ($\overline{B1}$ for P$e$1, for instance) delivers a signal F1, F2, F3 and one may write, for the gate P$e$1: $\overline{B1}.F2.F3=F1$.

It is thus seen that a gate the external control signal of which is absent (complementary signal $\overline{B1}$) supplies a signal (signal F1) whatever may be the values of the control signals applied to the other gates. In the same way, one has:

$\overline{B2}.F1.F3=F2$ $\overline{B3}.F1.F2=F3$.

The logical condition on the gate P$e$4 is: $F1.F2.F3=\overline{J1}$. This signal $\overline{J1}$ characterizes the first stable state or the 0 state of the multistable. If now the multistable receives the signals B1, $\overline{B2}$, $\overline{B3}$ one may write:

for the gate P$e$1 : $B1.F2.F3=\overline{F1}$ for the gate P$e$2 : $\overline{B2}.\overline{F1}.F3.=F2$ for the gate P$e$3 : $\overline{B3}.\overline{F1}.F2=F3$ for the gate P$e$4 : $\overline{F1}.F2.F3=J$.

The signal $\overline{F1}$ characterizes the second stable state or the 1 state of the multistable.

In a similar way:

The circuit is in its 2 state when only one signal B2 is applied to it, this state being characterized by the signal $\overline{F2}$;

The circuit is in its 3 state when only a signal B3 is applied to it, this state being characterized by the signal $\overline{F3}$.

The states 1, 2 and 3 are accompanied by a signal J1.

If two (or more) external control signals are simultaneously applied—the signals B1 and B2 for instance—one realizes that the circuit sets to either the 1 or the 2 state depending upon the very low differences of operation speed which exist always between the homologous elements of the gates P$e$1 and P$e$2.

The outputs of the gates P$e$1, P$e$2, P$e$3 are applied to the input of the coder CD constituted, for instance, by diode matrix. It supplies on its output K' a code characterizing the state of the multistable, this code comprising two binary digits in the case of the example. It will be reminded that this code, referenced H$k$1 or H$k$2 in the paragraph 1.1, identifies the calling input.

It is realized that the circuit which has just been described may be directly generalized into a circuit which presents, for instance, $m$ different stable states apart from the 0 state and which may be connected to the outputs B of $m$ connection units.

The transfer circuit TG provided for transmitting information between one of these connection units and the circuit IO comprises $m$ identical groups of transfer gates such as the group TG$a$1 (FIG. 5) assigned to the unit N1. As it has been seen during the description of FIG. 3, this information is transmitted over the group of four conductors C1 and, when this unit is selected, the signal $\overline{F1}$ (signal F1 applied to a blocking input of the AND-circuits P$h$1, P$h$2) controls their transfer to the output Q1.

On the other hand, the signal $\overline{F1}$ controls and the transmission towards the circuit IO of the identification code (multiple AND-circuit P$h$3). This transmission is carried out in series form, the series-parallel conversion being assured by the signals grouped under the reference T1. In the example of the figure, each code H$k$1 or H$k$2 comprises two digits and one has in the circuit RP$a$ of the level I: $T'1=t1+t2$ and the circuit RP$o$ of the level II:
$T''1=3+t4$.

The circuit IO (FIG. 1) receives thus, in the time interval $t1$ to $t4$, the information consisting the identification code H$k$ of the calling unit N$k$ (information received over the input K). It receives also, during the times $t1$ to $tm$:
on the input Q$a$: the states of the inputs E1 to E$m$,
on the input Q$t$: the states of the flip-flops G1 to G$m$,
on the input Q$c$: the code H$c$ constituted by the content of the permanent memory MP.

5. TOPOLOGY

The connection units and the selection circuits which were described in relation with FIGS. 3 and 5 can be designed in monolithic or "large-scale" integrated circuits (LSI). FIG. 6 shows thus the topology of a group of circuits comprising $n$ connection units N1–N$n$ designed in LSI-technology and the associated selection circuit RP1 which can also be designed in LSI-technology.

By way of an example, each LSI-connection unit comprises leads on its four sides which are distributed as follows:

Side 1 : $m$ leads are the inputs E1, E2... E$m$ (it is possible not to connect some of these leads), Side 2 : $m$ leads are the outputs A1, A2... A$m$ of which only those which must transmit orders to the peripheral units are connected.

Side 3 : $(m+1)$ leads are connected to the $(m+1)$ scanning signal conductors $t0$ to $tm$.

Side 4 : $m$ leads are used as permanent memory MP (FIG. 3). The leads corresponding to the scanning times of the test inputs are the only ones which are connected to the signal conductors $t1$ to $tm$. Thus, in the unit N1, the inputs E1 and E$m$ are the only test inputs and the terminals 1 and $m$ of the permanent memory are connected to the signals $t1$ and $tm$.

This selective connection of the terminals of the sides 1, 2 and 4 assures the specialization of the connection unit.

Besides, one has shown on this side the connection of the group of six conductors Bl–Cl–D1 particular to the unit N1.

The selection circuit RP1 which receives the groups of conductors Bl–Cl–D1 to B$n$–C$n$–D$n$ and which has the outputs J1, Q1, K elaborates, by way of nonlimitive example, the time signals $t0$ to $tm$ by means of a $(m+1)$ position ring counter KR whose advance is controlled by the time signals $b$. It results therefrom that the only common conductor to the different groups of connection units is that which transmits this clock signal.

6. THE INPUT-OUTPUT CIRCUIT

6.1–Introduction

The input-output circuit IO shown on FIG. 7 is a buffer circuit placed between the processor CP and the selection and connection circuits.

It uses a wired logic which delivers the following signals (see table III)

A. Call identification signals
  Signal P1: call of the processor CP,
  Signal P2: call of peripheral unit.

B. Phase signals S, S1, S2, and S3 which act as follows:
  Idle phase SO: the circuit IO is free, no connection unit being connected to it. One call may be seized and one of the signals P1 or P2 is then set up.
  Phase of data reception S1: the circuit IO receives informations from the calling connection unit which has been selected and identifies this unit. All these informations are immediately transmitted to the processor CP.
  Data processing phase S2: the informations are processed in CP during a duration which is not limited. At the end of these operations, the new informations are transmitted to the circuit IO.
  Data transmission S3: the informations just received by the circuit IO are transmitted to the selected unit.

FIG. 7 represents the detailed diagram of the input-output circuit IO in the drawing of which some simplifications have been made in order to facilitate the reading and to make the description easier. Thus:

a. Some control inputs of electronic gates receive a complex signal which is elaborated by an AND-circuit which is not shown: for instance the AND circuit which controls the setting to the 1 state of the flip-flop Y (circuit BY) receives a signal SO.$t1$. b. The AND and OR circuits are not referenced since they are defined without any ambiguity by the signals which are applied to them. For instance the flip-flop Y, circuit BY, is set to the 1 state for the logical condition SO.Y'$t1$ which defines perfectly the concerned AND circuit.

c. The logical condition $(t1–tm)$ is an abbreviation of the logical condition $t1+t2+... tm$.

d. The equation for the control of a flip-flop will bear the sign "→": for instance: SO.Y'.$t1$→Y.

e. The element referenced RE (circuit TU) is a shift register comprising $m$ JK flip-flops. It comprises the inputs 0, 1, the outputs 0, 1 and receives as clock signals the signals S3.$\overline{tO}$.$a$. It is used for carrying out the series-parallel conversion of the information received over the $m$ conductors Q'$c$ which are connected to the "set" inputs of the JK flip-flops. For the series reading, one applies to the input 0 of the register signals S3.$\overline{tO}$.$a$ so that the information is shifted by one rank towards the left at each scanning time except in $t0$ and, at the end of the cycle, all the flip-flops are in the 0 state. The output signal is gated by the fine time signal $b$ and is written at this fine time in the corresponding flip-flop of the memory MT. The element RD (circuit TU) is a conventional register of capacity of $y$ numbers and the element KS (circuit TC) is a four-position selector SO, S1, S2, S3 constituted by a counter and by a decoder. This selector is so designed that, when the time of the central exchange is switched on, it sets automatically in position SO.

6.2—Description and operation

The input-output circuit comprises:

The time control circuit TC which supplies the phase signals SO to S3 (selector KS) and the call type signals P1, P2 defined hereabove.

The circuit RU which controls the reception of the data transmitted over the conductors Q$a$, Q$b$, Q$c$, K and the identification of the calling input, the code H$t$ identifying this input is supplied by the clock CU (paragraph 1.2, FIG. 2).

The selection and transmission circuit TU which supplies the signal Z, the selection signals D1, D2... D$y$ of the connection units N1, N2.... N$y$ and the data which is transmitted over the conductor Q$d$.

The signals D1 to D$y$ are obtained by decoding the codes H$k$ applied to the inlet TD and sent by the circuit CP.

The circuit BY which supplies on the one hand a signal Y characterizing the fact that the control unit CP calls a connection unit and on the other hand a signal W characterizing the fact that the data processing in CP is completed.

Table III hereunder summarizes the different stages of operation of the circuit IO. In this table, the columns 1 and 2 represent the different phases and the column 3 the scanning times at which the elementary operations are performed. The columns 4 and 5 are assigned respectively to the operations concerning the calls of type P1 and the calls of type P2. It will be noted that the equations do not show the scanning times which are indicated in column 3 and which must be associated thereto.

These different operations will not be described in detail since all their steps are indicated in the table. However the following points will be noted:

6.21—Phase SO. If one receives, from the unit CP, a signal Y' characterizing a call originating from the processor, one has:

SO.Y'.*t*1→Y (at the time *t*1).

The call type identification is made in *t*2:

SO.Y.*t*2→P1

SO.$\overline{\text{Y}}$.J.*t*2→P2

It is seen that the call from the unit CP has priority, since a call from the peripheral unit can be taken into consideration only if the condition $\overline{\text{Y}}$ is fulfilled. In the case of a P1 call, the logical condition P1.SO.*tm.a* controls the writing, in the register RD, of the code H*k* identifying the connection unit which must be selected. The phase changement is carried out as follows: the flip-flop X*a* (circuit TC) being initially in the 1 state (signal XO=SO.*t*0), the logical condition (P1+P2).X *a.tm.b* controls the advance by one position of the selector KS which supplies a signal S1 from the beginning of the following time *t*0.

0003 NO CARD FOR THIS ILLUSTRATION.

6.22. Phase S1. This phase, which lasts one cycle *t*0 to *tm*, is divided into two parts:

*a*. *Time t*0, for a call P1: the condition P1.S1.*t*0.*a* controls the sending by the circuit TU, of a signal Z to all the connection units of the central exchange and of a signal D*k* to the connection unit which must be selected. As it has been seen, in the paragraph 2, only the unit D*k* remains calling and it is connected to the processor.

*b*. Time *t*1–*tm* for both types of call: the logical condition S1.(*t*1–A). *a* activates, in the circuit RU, the gates placed on the conductors Q*a*, Q*b* (connected respectively to the conductors C*a*, C*b* of the unit N*k*) and K (identification code H*k* of the connection unit). The information received in series form over these conductors is transmitted, as well as those received over the conductor Q*c* (code H*c*), to the unit CP.

At the same time, the information received on the inputs Q*a*, Q*b* is compared, in an exclusive OR-circuit which delivers a signal M' when they are different. In the case of a call P2 a signal M'' appears for the logical condition P2.M'.Q*c* which characterizes the fact that the states of the test input E*j* and of the flip-flop G*j* are different and that this input is calling.

The first signal M'' controls first the transfer, over the group of conductors RD, of the *e*-digit code H*t* ($2^e \geq m > 2^{e-1}$) and second the resetting of the flip-flop V which was set in the 1 state by the signal XO (XO=SO.*t*O). This resetting is carried out at the end of the fine time *a* at which the noncoincidence takes place and it blocks the transmission of the codes H*t* so that, if several test inputs of the unit N*k* are simultaneously calling, only the identity of the first of them is noted.

At the end of the cycle, one has: (P1+P2).X*a.tm.b*→S2.

6.23–Phase S2. This phase is reserved to the data processing in the unit CP and its duration is variable and may be higher than a cycle *t*O–*tm*. Therefore, the condition S2.*t*0→$\overline{Xa}$ (circuit TC) controls the blocking of the advance of the selector KS.

When the processing is completed, the unit CP sends a signal W' and, at the first time *t*(*m*–1), one has:

S2.W'.t(m–1).a→W (circuit BY) then: W.tm.a→Xa so that the selector KS is unblocked. The same logical condition W.tm.a controls the reception, in the circuit TU, of new data to be transmitted to the unit Nk and which comprises:

The code H*k* which is stored in the register RD,

The information intended for the temporary memory of the unit N*k* which is stored in the shift register RE.

One has afterwards: (P1+

6.24—Phase S3. The duration of this phase of data transmission is of one cycle of signals *t*0–*tm* during which a signal D*k* is sent to the unit N*k*. Each signal S3.FO.*a* controls the shift by one position of the informations in the register RE and there are transmitted at the fine times *b* to the unit N*k*.

P2).X*a.tm.b*→S3.

At the end of this cycle, one has: (P1+P2).X*a.tm.b.*→*SO.*

7. IDENTIFICATION

It has been seen, in the paragraphs 1.1 and 4, that the code H*k* received on the input K of the circuit IO enabled to identify the calling unit N*k*.

It has also been seen at the paragraph 6.2 that, in the case of a call P2, one obtained during the phase S1 the code H*t* identifying the calling input.

The code identifying an input is then constituted by the couple of codes H*t*/H*k*.

In the case of a call P1, the part H*k* of this code is used for selecting the connection unit and the final selection of the input is carried out, in the unit CP, by means of the code H*t*.

On the other hand, a part of this code H*k*, vizus the code H*k*', may be used for identifying, when receiving of data in the unit CP (phase S1), the type of operation for which the connection unit is specialized.

In a reverse way, when the processor wants to search for a free peripheral unit, one obtains the codes of these units by adding to the code H*k*' characterizing the function, a cyclic series of codes H*k*'', each couple of codes H*k*'/H*k*'' constituting the code H*k* of a connection unit specialized in this function.

During the phase S1, one receives also the code H*c* constituted by the content of the permanent memory MP (FIG. 3), and which contains 1's at the time positions corresponding to test inputs. It is realized that this code is different according to the function for which the connection unit is specialized and that, even for a given function, one may easily obtain different codes according to the connection units. Thus for instance, for a unit specialized in the function N*a*, the code is 11111... since each input is used for a line or trunk test. Nevertheless if one does not connect one input out of *m*, one may obtain *m* different codes such as 01111, 10111 etc . . .

These codes H*c* may be used, as an alternative to the preceding solution, for identifying the type of function in which the connection unit is specialized, or for carrying out a preselection.

Thus, the function N*a* may be subdivided in:

N*a*1 : Incoming trunks—code H*c* : 0111111...

N*a*2 : Outgoing trunks—code H*c* : 1011111...

N*a*3 : Normal lines—code H*c* : 110111...

N*a*4 : Priority lines:code H*c* : 1110111...

N*a*5 : Conference lines:code H*c* : 11110111...

N*a*6 : Lines having no access to the external network—code H*c* : 1111101... etc.

When one of these peripheral units appears to be calling, the decoding of its code H*c* enables to know immediately its category without having to refer to a memory of the processor CP.

While the principles of the above invention have been described in connection with specific embodiments and particular modifications thereof it is to be clearly understood that this description is made by way of example and not as a limitation of the scope of the invention.

We claim:

1. A connection unit for providing connections between peripheral equipment associated with a telephone exchange system and a central processor associated with the central exchange comprising a plurality of peripheral units, *m* inputs connected to *x* peripheral units (where $x \leq m$) in order to receive test input signals, a temporary memory with *m* flip-flops in which may be written the previous state of the peripheral units as indicated by test input signals as well as operation codes, and *m* outputs associated with the *m* flip-flops, a portion of said outputs being connected to the peripheral units in order to send orders represented by the operation codes written in the corresponding flip-flops.

2. A connection unit as claimed in claim 1, forming one of a group of *n* connection units coupled to a selection circuit which controls the transfer, to the processor, of information collected by only one calling peripheral equipment, even if several units of equipment are simultaneously calling, and means disposing of two selection stages in series when the total number of connection units is greater than $n$.

3. A connection unit as claimed in claim 1, in which the connection unit includes a permanent memory and an input-output circuit including a call flip-flop, the permanent memory provides signals of use in controlling the cyclic scanning of the test inputs and the comparison of the information obtained with the homologous previous-state information, and in case of disparity, the connection unit calls a central processor by setting the call flip-flop to the 1 state.

4. A connection unit as claimed in claim 2, in which results of processing data in the processor are transmitted to the calling unit.

5. A connection unit as claimed in claim 2, in which a central processor is coupled to collect from and to transmit information to a connection unit, and it sends to the connection unit a signal which makes it calling and which resets to zero the call flip-flops of all the other units of the central exchange.

6. A connection unit as claimed in claim 1, including a main clock delivering in a cyclic way signals to $t1$, $t2$,... $tm$ of equal duration, $m$ inputs E1, E2... E$m$ of the connection unit selected cyclically by the signals $t1$, $t2$... $tm$, a temporary memory comprising $m$ flip-flops G1, G2... G$m$ the outputs of which are selected by the signals $t1$, $t2$... $tm$, a permanent memory delivering a signal C$c$ at each of the $p1$ scanning times (where $p1 \leq m$) which correspond to $p1$ test inputs which are connected to peripheral units in order to test their state, a comparator which delivers, at time $tj$, a disparity signal M when the state of the test input E$j$ is different from that of the flip-flop G$j$, and an input-output circuit comprising a call flip-flop B which is put to the 1 state either by a signal M or by the control processor of the telephone exchange when this latter wants to select the considered connection unit.

7. A connection unit as claimed in claim 6, in which the permanent memory supplies a series of signals C$d$ during one cycle of the scanning signals $t1$, $t2$... $tm$, said signals C$d$ serving as a code characterizing the type of function fulfilled by the connection unit, and the functions for which $p1$=$m$ may be differentiated the ones from the others in leaving free one input of different index according to the function.

8. A connection unit as claimed in claim 1, forming one of a group of $m$ connection units in which a connection to an input-output circuit of a central processor is carried out through selection circuits grouping $n$ connection units, said selection circuits being connected so that there is a multilevel selection, each of said selection circuits comprising a multistable circuit with $n$+1 stable-states and a transfer circuit assuring a bidirectional transfer of data between a selected connection unit NK and the input-output circuit, the first selection level comprising $z$ selection circuits, means connecting the multistable circuit of each selection circuit to the 1 outputs of the call flip-flops of $n$ connection units, said circuit delivering when the call flip-flop B$k$ of the unit N$k$ is in the 1 state an activation signal of the transfer gates associated with said unit and a call signal of the next selection level and if several connection units are simultaneously calling said multistable circuit choosing one of them without ambiguity and at random.

9. A connection unit as claimed in claim 8, in which the processor is able to select directly the unit N$k$, the processor transmits simultaneously a signal Z and a signal D$k$ at a time to, the signal Z is transmitted to all the connection units of the central exchange which resets all the call flip-flops, the signal D$k$ is transmitted to set the flip-flop B$k$ to the 1 state so that only the unit N$k$ is calling and it may be immediately connected to the input-output circuit, the signal D$k$ being delivered by the decoding of the identification code of the unit N$k$.

10. A connection unit as claimed in claim 10, in which the unit N$k$ is selected by the call either of a peripheral unit or by the control unit, the states of the inputs E1, E2... E$m$ and of the flip-flops G1, G2... G$m$ are transferred, through the various selection stages, to the input-output circuit as well as the identification codes of the connection units and of the used selection circuits that, and when the call originates from a peripheral unit, the comparison of these signals in the said input-output circuit gives the identification code of the first input whose state has changed and this information is processed under the control of the processor.

11. A connection unit as claimed in claim 8, in which after data processing is completed in the processor, a signal D$k$ is transmitted to the unit N$k$ to block the operation of said unit and the information supplied by the processor is transferred to said connection unit under the control of the signals $t1$, $t2$... $tm$.

* * * * *